Feb. 9, 1937.                H. C. MARLOW                2,070,514
                      COMBINATION SINKER AND LURE
                         Filed Sept. 30, 1935

Harold C. Marlow, INVENTOR
BY Victor J. Evans & Co.
ATTORNEY

Patented Feb. 9, 1937

2,070,514

UNITED STATES PATENT OFFICE 2,070,514

COMBINATION SINKER AND LURE

Harold C. Marlow, Niles, Mich.

Application September 30, 1935, Serial No. 42,928

1 Claim. (Cl. 43—27)

This invention relates to fish tackle and more particularly to a sinker to be connected to a line in lieu of a common type of sinker which descends rapidly in water and has for the primary object the provision of a device of this character which when cast into water will sink slowly carrying gradually downwardly the lines and hooks attached thereto so that fish may have opportunity to be attracted to the bait and can grasp the bait whereby the device with the hooks and bait provides a fish lure and the device will readily rest on or be supported by weeds or other growth so that the hooks and bait remain above the weeds and growth to permit the fish to be more readily attracted thereto and grasp the bait.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating my invention applied to a fish line and showing its association with the hooks and bait of the line.

Figure 1:
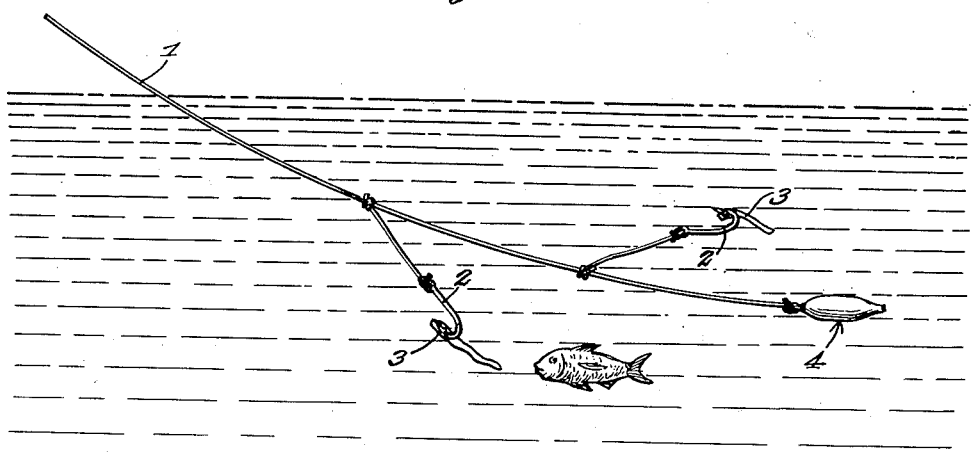
Figure 2:
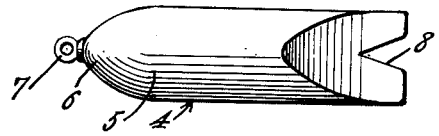
Figure 2 is a plan view illustrating the sinker.
Figure 3:
Figure 3 is a side elevation illustrating the same.
Figure 4:
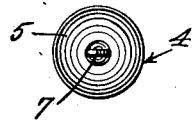
Figure 4 is an end elevation illustrating the device.

Referring in detail to the drawing, the numeral 1 indicates a fish line cast into water and carrying hooks 2 to which bait 3 is secured. Secured to the line 1 and preferably at the free end thereof is a sinker 4 forming the subject matter of the present invention. The weight of the sinker 4 is such that its displacement of water will be gradual so that the sinker when cast into the water will slowly sink or descend, gradually carrying the line and the hooks downwardly so that the fish will be readily attracted to the bait and give the fish opportunity to grasp the bait. Also due to the construction and weight of the sinker 4 it will readily rest on or catch upon weeds and other growth extending above the bottom of the water so that the hooks and bait remain afloat above said weeds or growth whereby the fish which usually stay around the growth may be attracted to and grasp the bait.

The sinker 4 is constructed of any material suitable for the purpose and consists of a substantially cylindrical shaped body 5 reduced or tapered towards one end, as shown at 6, to which end is secured an eye 7. The eye is employed for connecting the line to the body. The body is also tapered upon opposite sides in the direction of the opposite end of the body from the eye and is provided with a V-shaped notch 8. The tapered portion of said last-named end of the body will further aid the body in gradually or slowly sinking in the water, besides giving to the body a more pleasing and attractive appearance. The body 5 may be of any desired color so that the body will cooperate with the hooks and bait in forming a very efficient and attractive lure to fish.

Having described the invention, I claim:

A sinker comprising a substantially cylindrical shaped body of a weight which will bring about gradual sinking or descending thereof in water to cause a line and hook with bait attached thereto to slowly descend in the water and having one end rounded and its opposite end provided with oppositely disposed tapering faces converging towards the last-named end, said last-named end of the body having a V-shaped notch, and an eye secured to the first-named end of the body.

HAROLD C. MARLOW.